(12) United States Patent  (10) Patent No.: US 7,917,409 B1
Whiteley et al.  (45) Date of Patent: Mar. 29, 2011

(54) METHOD FOR MONITORING AND ASSEMBLING EQUIPMENT

(75) Inventors: Thomas G. Whiteley, Houston, TX (US); James McGrath, Houston, TX (US); Ben R. Sullivan, Houston, TX (US)

(73) Assignee: PPI Technology Services, LP, Houston, TX (US)

( * ) Notice: Subject to any disclaimer, the term of this patent is extended or adjusted under 35 U.S.C. 154(b) by 64 days.

(21) Appl. No.: 12/578,389

(22) Filed: Oct. 13, 2009

Related U.S. Application Data

(63) Continuation-in-part of application No. 10/277,531, filed on Oct. 22, 2002, now Pat. No. 7,603,296.

(51) Int. Cl.
*G06Q 10/00* (2006.01)
(52) U.S. Cl. .... 705/28; 701/213; 340/572.1; 340/572.4; 340/572.5; 700/79
(58) Field of Classification Search ............ 235/385, 235/383, 384; 700/225, 215, 229, 115, 95; 340/572.1, 572.4, 572.5; 705/28; 701/213
See application file for complete search history.

(56) References Cited

U.S. PATENT DOCUMENTS

| | | | |
|---|---|---|---|
| 4,570,416 A * | 2/1986 | Shoenfeld | 53/415 |
| 5,656,786 A | 8/1997 | Curtis, Jr. et al. | |
| 5,931,877 A | 8/1999 | Smith et al. | |
| 5,971,587 A * | 10/1999 | Kato et al. | 700/115 |
| 6,047,579 A * | 4/2000 | Schmitz | 72/15.1 |
| 6,208,910 B1 * | 3/2001 | Michael et al. | 700/225 |
| 6,346,884 B1 * | 2/2002 | Uozumi et al. | 340/572.1 |
| 6,370,455 B1 | 4/2002 | Larson et al. | |
| 6,442,460 B1 | 8/2002 | Larson et al. | |
| 6,600,418 B2 * | 7/2003 | Francis et al. | 340/572.1 |
| 6,897,827 B2 | 5/2005 | Senba et al. | |
| 7,002,451 B2 * | 2/2006 | Freeman | 340/10.51 |
| 7,036,729 B2 * | 5/2006 | Chung | 235/385 |
| 7,076,532 B2 | 7/2006 | Craik | |
| 2001/0002464 A1 | 5/2001 | Hogan | |
| 2001/0047283 A1 | 11/2001 | Melick et al. | |
| 2002/0046712 A1 * | 4/2002 | Tripp et al. | 119/450 |
| 2002/0055798 A1 * | 5/2002 | Haye | 700/95 |
| 2002/0185532 A1 | 12/2002 | Berquist et al. | |

(Continued)

OTHER PUBLICATIONS

Ed Rogin. (Dec. 2001). RFID gets the message. Control Engineering, 48(12), 52. Retrieved Jan. 25, 2011, from ABI/INFORM Global.*

(Continued)

*Primary Examiner* — Matthew S Gart
*Assistant Examiner* — Olusegun Goyea
(74) *Attorney, Agent, or Firm* — Buskop Law Group, PC; Wendy Buskop

(57) ABSTRACT

A method for monitoring shipments of a plurality of components and enabling assembly of the plurality of components. The method can include the steps of encoding a unique identifier and specification information on each component into a data storage of a GPS device; encoding assembly instructions for each component; attaching the GPS device to the component; actuating each GPS device to provide a longitude and latitude signal to a network; tracking the location of each component; shipping the components while tracking the location of the components until the components reach a designated location; and retrieving from each component assembly instructions, specification information, and inspection information. The method can include assembling the components using the assembly instructions at the designated location, and forming a record of each route used by each component.

18 Claims, 1 Drawing Sheet

U.S. PATENT DOCUMENTS

| | | |
|---|---|---|
| 2003/0041044 A1 | 2/2003 | Monestere, III |
| 2003/0069716 A1 | 4/2003 | Martinez |
| 2003/0149526 A1* | 8/2003 | Zhou et al. .................. 701/213 |
| 2004/0233065 A1* | 11/2004 | Freeman ................. 340/825.49 |
| 2005/0113949 A1* | 5/2005 | Honda ............................ 700/95 |
| 2005/0248459 A1* | 11/2005 | Bonalle et al. ............ 340/572.8 |
| 2006/0049248 A1* | 3/2006 | Becker et al. ................ 235/385 |
| 2006/0195550 A1 | 8/2006 | Craik |
| 2007/0050206 A1 | 3/2007 | Whikehart |
| 2008/0103622 A1* | 5/2008 | Hanses et al. ................ 700/116 |
| 2008/0189325 A1* | 8/2008 | Hanses et al. .............. 707/104.1 |
| 2009/0128291 A1* | 5/2009 | Rofougaran et al. ........ 340/10.1 |
| 2009/0198365 A1* | 8/2009 | Seaman et al. ................ 700/108 |

OTHER PUBLICATIONS

Feare, Tom. (Feb. 1988). Radio Frequency Technology Sends Clear Signal: Success. Modern Materials Handling, 43(2), 107. Retrieved Jan. 25, 2011, from ABI/INFORM Global.*

Marks of progress. (Nov. 1998). The Engineer,25. Retrieved Jan. 25, 2011, from ABI/INFORM Global.*

\* cited by examiner

METHOD FOR MONITORING AND ASSEMBLING EQUIPMENT

CROSS REFERENCE TO RELATED APPLICATIONS

The present application is a continuation-in-part application which claims the priority and benefit of U.S. patent application Ser. No. 10/277,531 filed on Oct. 22, 2002, entitled "METHOD FOR MONITORING WELL EQUIPMENT DURING TRANSPORT AND STORAGE", which issued as U.S. Pat. No. 7,603,296 on Oct. 13, 2009. This reference is hereby incorporated in its entirety.

FIELD

The present embodiments generally relate to inspection and monitoring of equipment and assemblies, particularly during storage and shipment of the equipment and assemblies, to verify the integrity of such items. The equipment can be equipment used on or in connection with wells, such as oil or gas wells.

BACKGROUND

Oil and gas well completion tools, drilling tools, and other completion and drilling accessories required for use on a particular well are typically placed in one or more shipping containers for transportation to a well site for use on a rig or a well operation. Those items of well equipment are assembled as a group according to the specific well operation for which they are intended at the particular well site. The shipping container or containers typically used may be a metal basket of varying dimensions. Such a metal basket or container is placed on a truck, marine vessel, or other transport vehicle to be transported to a well site. At the well site, the tools are then available for use. Rather than containers, some or all of theses objects may be placed on a trailer, strapped or secured down, and then transported to a well location.

In addition, for certain wells or certain well operations, specialized items of equipment are required. This may include, but is not limited to, the certification of certain drilling and completion components and assemblies. This certification may include re-inspection of assembled components, testing of assembled components, and verification of completion of components. Certification of the materials or composition of particular components can also be an important factor. For example, if there are special pressure or gas composition conditions in a particular well, the well tools may need to be of a particular composition, or of a specified strength of steel.

Certain components or assemblies can be taken or lost from their containers while in storage or during a shipment to fulfill an order for another job. This loss can occur for a number of reasons. For example, such a loss might occur when several jobs are being loaded and equipment for one job must be shipped before the others. Problems can occur when the component that was taken from one shipping container does not get replaced. The container with missing equipment can be sent to a well site and the absence of one more item only then becomes known. In such a case, operations on the well rig must be suspended to wait on a replacement component or assemblage.

Suspension of operations of an offshore drilling or completion rig or land drilling or completion rig to wait on components can be expensive. The costs could range from ten thousand dollars per day on a land rig to over two hundred fifty thousand dollars per day for an offshore rig.

A need exists for a method of monitoring shipments of equipment and for proving for assembly of equipment upon arrival to a designated location. The present invention provides a new and improved method of monitoring shipments of equipment components during transport and storage. In particular the method can be used for monitoring shipments of equipment for use in a well operation. Information about the components of the shipment can be encoded into a Global Positioning System (GPS) apparatus, which can be a GPS chip set or a GPS device. The components, for example components for a well job, can then be assembled into one or more shipment modules or baskets.

A need exists for a method of continuous monitoring of equipment during storage, transport, and use. During transport and storage, the GPS apparatus can be continuously monitored to ensure that the equipment components are not diverted or otherwise misplaced during transport and storage.

A need exists for a method of providing an alarm when equipment arrives at the wrong location after transport. Alarms can be used with an associated tracking processor to alert a user that the equipment or components are in the wrong location. A thread protection assembly can be adapted to be mounted on a threaded connector of the component and can have the GPS apparatus contained within it or on it.

The present embodiments meet these needs.

BRIEF DESCRIPTION OF THE DRAWINGS

The detailed description will be better understood in conjunction with the accompanying drawings as follows.

Figure 1:
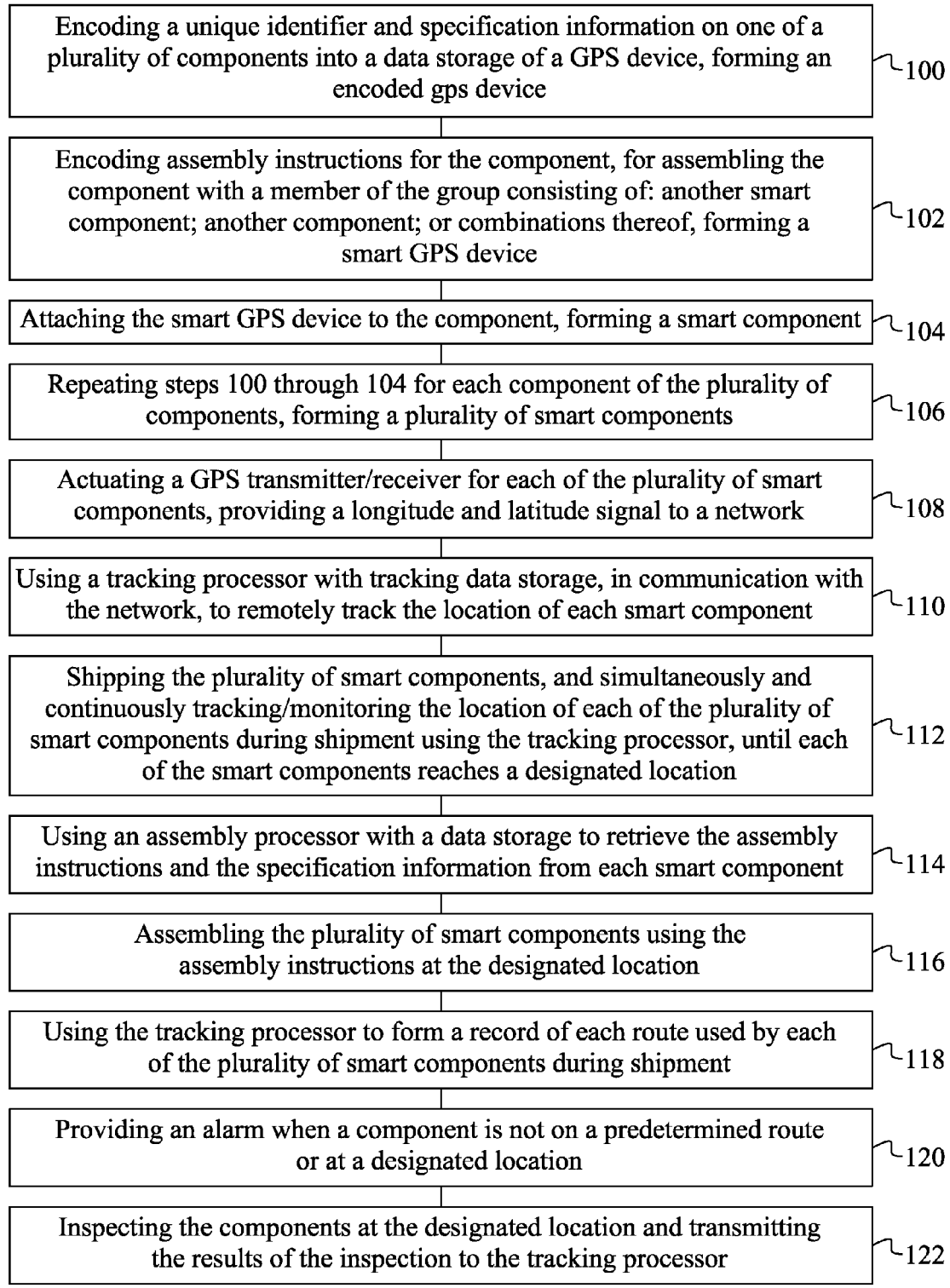
FIG. 1 is a flow chart that schematically indicates an embodiment of the method.

The present embodiments are detailed below with reference to the listed Figures.

DETAILED DESCRIPTION OF THE EMBODIMENTS

Before explaining the present method in detail, it is to be understood that the method is not limited to the particular embodiments, and the present embodiments can be practiced or carried out in various ways.

The present embodiments provide for inspections of completion components and assemblages of equipment. For example, the equipment can be for use in wells, such as oil, gas, and/or water well operations. The well operations may be drilling or completion or other well operations.

Embodiments can be based on the use of a Global Positioning System "GPS" apparatus or device, such as those commercially available from TomTom, Garmin, or other commercial sources. These devices can contain data memory or storage for receipt of information, and can wirelessly send signals to satellites communicating information including information on the devices location/position. The method is not limited to use with the above mentioned commercially available GPS apparatus or device, and can use another GPS apparatus or device.

In the embodiments, GPS apparatuses can be individually encoded with information about equipment and can then be mounted or otherwise suitably attached to that equipment.

The present embodiments relate to a method for monitoring shipments of a plurality of components and further enabling assembly of the plurality of components.

Embodiments of the method can include encoding a unique identifier and specification information on one of the plurality of components into a data storage of a GPS device, forming encoded components. The unique identifier can be a serial number, a word, or any other number or code which uniquely identifies a particular component or type of component.

Depending on the memory size of the GPS device, various types of data, specification information, inspection information, assembly information, or other information can be received and encoded therein. Thus, information contained in the GPS device can contain selected ones or all of the following types of information:
a. dimensional specification of a particular component; b. material composition of the component; c. date of manufacture; d. date of assembly; e. date and/or results of quality inspection survey(s); f. quality inspector(s); g. manufacturer/source of origin of component or its material; h. machining process for component; i. contact personnel associated with manufacturer of component; j. a unique identifier number that identifies a component and its relation in a series of components; k. date that components or assemblage of components were shipped or made; l. project codes; m. surveillance or inspection work order numbers; n. vendor or completion company code numbers; o. location of the component in a completion string at the job site; and p. trip routes.

The GPS device can have a power supply for providing power to the GPS device. The power supply can be a battery, a solar panel, or any other available and suitable source of power. The GPS device can have a GPS processor and a GPS signal transmitter/receiver. The GPS processor can be any digital computer processor. The GPS signal transmitter/receiver can communication with satellites and other networks and communication devices.

An encoded GPS device can be formed by encoding a unique identifier and specification information onto the data storage of the GPS device.

Furthermore, assembly instructions for the encoded component can be encoded into the data storage of the GPS device. The assembly instructions can be instructions for assembling the encoded component with another encoded component, another component; or combinations thereof, forming a smart GPS device. The assembly instructions can contain detailed instructions needed for assembling various components together.

It is contemplated that documentation in the form of project management data can be generated. The documentation can be either in document or digital form, indicating the required components for a particular operation. Other relevant documentation, such as a surveillance work order, can also be generated. If required, coordination of vendor(s) of the components can be made to the extent required to authenticate the information relating to the components. All such information included in the documentation can be stored in the GPS device data storage.

It is further contemplated that an inspector can be sent to an equipment plant or yard, at which location the inspector can perform an inspection/surveillance of the component or assemblage. Inspection information can be separately encoded onto the data storage of the GPS device, or inspection information can be part of the specification information.

Encoding or programming of the GPS device can be done at an equipment yard, at a manufacturer's facility, at a shipping yard, at a port, or at some other site. The GPS device can be programmed for each component inspected or surveyed. Encoding can be performed in the conventional manner of GPS device encoding/programming, with the assistance of an encoding computer or a similar device. Each encoded GPS device can then be specifically assigned or allocated to a component, an assemblage, or a shipping module. A unique identifier number or code can be programmed or fed into the GPS device along with any desired portions of information of the type described above.

At this time, the inspector can also record the encoded information in a suitable memory or data storage device, such as a computer or other similar device. This forms and stores a database of information for later retrieval, use, and processing concerning the components.

The smart GPS device can then be attached to the component forming a smart component.

The GPS device can be mounted with the component if the GPS device has not already been embedded or molded into the component.

Placement of the GPS device can be done using a variety of techniques. One way, discussed above, is to embed the GPS device in a component or an assemblage associated with the component. This provides an advantage that the GPS device can not be easily removed. The GPS device can be embedded at time of manufacture of the component.

Another method of placement includes affixing or mounting the GPS device externally in some form or fashion to the component. This may be done in a variety of ways. The GPS device can be placed on the component using a self-adhesive card that contains the GPS device. An advantage of this is that the GPS device can be of a disposable type, and thus relatively inexpensive. Upon arrival of the components at the designated location or another final location, the self-adhesive card and the GPS device can be taken off and disposed of. An advantage is that a self-adhesive card is easily applied and inexpensive in the overall process of inspecting, tagging, and inventorying a component. A GPS device can also be strapped via a plastic strap onto a component, and then be available to be reused.

Use of a GPS device embedded into a thread protector or a foam piece can be an advantageous way to place the GPS device with components, as the GPS device can be re-programmed and re-used repeatedly.

The above steps can be repeated for each component of the plurality of components, forming a plurality of smart components.

In embodiments, the GPS transmitter/receiver can be actuated for each of the plurality of smart components, providing a location signal to a network, which can include a satellite. The location signal can include a longitude and latitude signal. The longitude and latitude signal, as used herein, can be a signal containing information on the longitude and latitude of the GPS device. The longitude and latitude signal can be sent continuously, continually, and a predetermined intervals of time.

A tracking processor with a data storage can be in communication with or connected to the network. The tracking processor can receive signals through the network from the GPS transmitter/receiver, including the longitude and latitude signals. The tracking processor can be used to remotely track the location of each smart component. In embodiments, the tracking processor can be a processor on a computer.

The plurality of smart components can be shipped while simultaneously and continuously tracking each location of each of the plurality of smart components during shipment with the tracking processor. In embodiments, the location of the smart components can be tracked until each smart component reaches a designated location. However, it is contemplated that the smart components can be tracked at other times, or continuously without ceasing.

The components can be placed into a shipping module and prepared for shipment to a designated location, which can be a well site. As an example, a shipping module can be about six feet wide, about 20 feet to about 40 feet long, can have an open top, can have caged sides, and can have a solid sheet steel or expanded metal bottom.

The assembly instructions, specification information, inspection information, and any other data or information stored on the GPS device database can be retrieved from each smart component using an assembly processor. The assembly processor can have a data storage and a power supply. The assembly processor can be in communication with the GPS device.

In embodiments, the assembly processor can be a processor on a computer. The GPS device can be connected with the assembly computer to establish communication with the assembly processor/data storage. This connection can be achieved using a USB cable, a wireless signal, or any other electronic and/or digital communication means.

For example, when each of the components, including smart components, reach a designated location, a user can retrieve the instructions and information from each GPS device database using the assembly processor so that the user can utilize the information and instructions in assembling the components for use and/or operation at the designated location.

The assembly processor can collect the component or assembly information/instructions that is contained in the GPS device and can store the information/instructions in the data storage associated with the assembly processor. The information/instructions retrieved by the assembly processor can correspond to the information/instructions encoded into the GPS device in previous steps. The information collected by the assembly processor can be used to further verify that the components reached the designated location.

The components can be inspected upon arrival to the designated location. The inspection can be performed substantially as performed before shipment of the components, forming inspection data, which can be stored in the GPS device data storage and/or the data storage associated with the assembly processor.

A record of each route used by each of the plurality of smart components can be formed with the tracking processor. This record can be stored in the data storage of the tracking processor. The record can provide evidence and assurance of the route and location of each component at particular points in time.

In embodiments, information about each of the various components can be available, and sets of information about composite groups of components for shipment to a location, such as a well operation at a well site, can be available. The integrity of shipment may be monitored according to embodiments of the invention, while the shipment is in transit.

In embodiments, a GPS device may be placed on or in a shipping module or vessel. Shipping data about the components in the shipping vessel or module can be stored in the GPS data storage.

Location and shipping data of each GPS device, and therefore each component and/or container associated with each GPS device, can be available to a user through a network. The network can include at least one satellite in communication with each GPS device.

Each satellite can in-turn communicate with a client device, which can be a tacking processor. The tracking processor can allow real-time monitoring of the components during shipment to a well site or another location anywhere on the globe.

Monitoring of the components and shipping modules may also be done from a central location, or a mobile location via a tracking processor which can be in a fixed, a mobile, or a handheld computing device. This permits travel and location of the components and shipping modules to be tracked as it makes its way by truck, plane, or other transport method to a designated location.

Transit of the module(s) may be tracked, via the Internet or similar means, by use of a fixed or mobile computing device, or any other device that can receive information from a satellite. A user can ensure that components and shipping modules are delivered to designated locations because the GPS device will transmit to the user through the network the location information when the component/module reaches the particular location, as well as during transit.

A user can similarly ensure accuracy of the contents of shipping vessel or module because each GPS device will transmit to the user location information when the component/module reaches the particular location. The components received at the designated location can thus be matched with the original data compiled before shipment during the completion inspection process.

In embodiments, the GPS device can be embedded or molded into a device that can travel with other completion components for use at a designated location, including for us in oil and gas well operations. The GPS device can remain with the component it is embedded within during use of the component, including during oil and gas well operations. The GPS device can also remain with the component it is embedded within during inspection and surveillance of the component prior to shipment of, during shipment of, and after the shipment of the component to a designated location, including a well job site.

In embodiments, the GPS device can be provided with threaded connectors. The GPS device can be embedded or molded into a thread protector. The thread protector can be made of synthetic resin, foam, metal or any other suitable material. The thread protector can be mounted and can protect make-up threads for tubular goods and other components, including oil and gas down hole components. The thread protector can be a thread protector for a pin end of a threaded connector. Thread protectors according to embodiments can be either of the type which can be inserted in a box end (female end) of a tubular product or component, or the thread protectors can be of the type mounted on the pin end (male end) of such a component or tubular good.

The GPS device can be embedded or encapsulated into the foam or synthetic resin body the thread protector. By so mounting the GPS device in the thread protector, the GPS device can be protected from damage while a component is transported, inspected, or surveyed. The GPS device can also be affixed in other ways to the body of the thread protector.

Smart components can include any component being shipped from one location to another or any other components that can be tracked. Examples of components that can be formed into smart components include well equipment, such a well equipment for oil, gas, and water well operations.

Well equipment can include: drilling equipment, completion equipment or associated well equipment. Completion equipment can be any of the various items, pieces or parts that can be included to make up a well completion assembly for a well. A well completion assembly can be equipment that is capable of being installed or used at the surface, or lowered into an oil or gas well for drilling or completion of a well or for other operations in a well. Well drilling equipment can include any of the various items, pieces or parts used as a part of, or in connection with, the drilling of a well, whether at the well head, in the borehole, or elsewhere in connection with the well drilling. Associated well equipment can be equipment used in connection with well operations, whether in the well, at the wellhead, or in use in some manner associated with the well.

The well equipment of any of the foregoing types used in a well can be lowered into the well by a number of conventional techniques, such as on a work string, as part of a production tubular string, on a wire line or on a slick line. The component (s) and/or the assembly thus may or may not be threadably engaged with other equipment.

Thus with the foregoing in mind, well equipment can include the following types of equipment: well head equipment; blowout preventer (BOP) equipment; storage tanks; oil and gas production equipment; surface site facilities; offshore platform structures; land well structures; well completion assemblies; oil and gas rig motors-engines-turbines; oil and gas meters; gas compression equipment; dehydration equipment; process water equipment; subsea wellhead housings; subsea wellheads; subsea and mudline hanger running tools; subsea rental tools; subsea trees; junction plates/terminations; leads/jumpers for umbilicals; mudline hanger equipment; corrosion caps/clean out tools; cameras; remotely operated vehicle (ROV) tools; safety valves; pup joints; flow couplings and flow pups; landing nipples; valves; valve release (VR) plugs; tees; tubing head adapters; tree adapters; slips and packoffs; chokes—adjustable and positive; double pin subs; in line ball valves, or TIW's; inside blowout preventers (BOP's); companion flanges; tubing hangers; mud motors; measurement while drilling (MWD)/logging while drilling (LWD) tools; stabilizers; and drilling jars and bottomhole assemblies (BHA's);

Other types of equipment, including but not limited to equipment used on or in connection with well operations, with which the present invention may be used will be apparent to those in the art.

A surveillance report can be formed, which can contain an inventory of each GPS device, each component, and/or each shipping module; a record of whether or not each component passed inspection; a corresponding GPS device code number; and any other information/instructions stored in the GPS device as discussed above. Based on the surveillance report and the record of each route, appropriate accounting and control procedures can be performed. The accounting and control procedures can be performed by the user at the designated location. Also, the surveillance report and the record of each route, along with any other associated information, can be communicated to a remote appropriate office(s) associated with the particular component so that other users at the appropriate office can perform accounting and control procedures. Information concerning the appropriate office, the appropriate accounting procedures, and the appropriate control procedures can be stored on the GPS device and retrieved therefrom using the assembly processor.

It should be noted that encoded results of the process steps above described may be fed via spread spectrum or other transmission to a computer at a central control or data processing location. The transmission of the data may be done over the Internet or other communications media, and may include one or more computing devices at the point of assembly or origin of shipping as the control location.

The satellite can be in communication with a central control or data processing location, for transmitting data from the components during transport, and further upon arrival to the designated location.

Turning now to FIG. 1, a schematic of an embodiment of the method is shown. A first step 100 includes encoding a unique identifier and specification information on one of a plurality of components into a data storage of a GPS device, forming an encoded GPS device.

Step 102 includes encoding assembly instructions for the component, for assembling the component with a member of the group consisting of: another smart component; another component; or combinations thereof, forming a smart GPS device.

Step 104 includes attaching the smart GPS device to the component, forming a smart component.

Step 106 includes repeating steps 100 through 104 for each component of the plurality of components, forming a plurality of smart components.

Step 108 includes actuating a GPS transmitter/receiver for each of the plurality of smart components, providing a longitude and latitude signal to a network.

Step 110 includes using a tracking processor with tracking data storage, in communication with the network, to remotely track the location of each smart component.

Step 112 includes shipping the plurality of smart components, and simultaneously and continuously tracking/monitoring the location of each of the plurality of smart components during shipment using the tracking processor, until each of the smart components reaches a designated location.

Step 114 includes using an assembly processor with a data storage to retrieve the assembly instructions and the specification information from each smart component.

Embodiments of the method can also include step 116, which includes assembling the plurality of smart components using the assembly instructions at the designated location.

Embodiments of the method can also include step 118, which includes using the tracking processor to form a record of each route used by each of the plurality of smart components during shipment.

In embodiments, the method can further include the step 120 of providing an alarm when a component is not on a predetermined route or at a designated location. A predetermined route can be a route that the component is to travel on during transport to the designated location.

Embodiments of the method can further include the step 122 of inspecting the components at the designated location and transmitting the results of the inspection to the tracking processor.

While these embodiments have been described with emphasis on the embodiments, it should be understood that within the scope of the appended claims, the embodiments might be practiced other than as specifically described herein.

What is claimed is:

1. A method for monitoring shipments of a plurality of components and enabling assembly of the plurality of components, the method comprising:
 a. encoding an identifier and specification information on one of the plurality of components into a data storage of a global positioning system (GPS) device, forming an encoded GPS device; wherein the GPS device further has a GPS processor and a GPS transmitter/receiver;
 b. encoding assembly instructions for the component into the data storage of the GPS device, forming a smart GPS device;
 c. attaching the smart GPS device to the component, forming a smart component;
 d. repeating steps (a) through (c) for each component of the plurality of components, forming a plurality of smart components;
 e. actuating the GPS transmitter/receiver for each of the plurality of smart components, wherein each GPS transmitter/receiver provides a location signal to a network;

f. using a tracking processor in communication with a tracking data storage to track locations of each smart component, wherein the tracking processor is in communication with the network;

g. shipping the plurality of smart components while simultaneously tracking each location of each of the plurality of smart components using the tracking processor until each smart component reaches a designated location;

h. retrieving from each smart component the assembly instructions and the specification information using an assembly processor in communication with an assembly data storage; and i. assembling the plurality of smart components at the designated location, using the assembly instructions retrieved from each of the smart components.

2. The method of claim 1, wherein the assembly instructions comprise instructions for assembling the smart component with a member of the group consisting of:
(i) another smart component;
(ii) another component; or
(iii) combinations thereof.

3. The method of claim 1, further including the step of forming a record of each route used by each of the plurality of smart components using the tracking processor.

4. The method of claim 1, wherein the specification information for each smart component includes: dimensional specifications for the smart component; material composition of the smart component; inspection test results for the smart component; a source of origin or manufacture of the smart component; at least one trip route of the smart component; or combinations thereof.

5. The method of claim 1, wherein the GPS device is attached to the component by embedding the GPS device into the component.

6. The method of claim 1, wherein the GPS device is disposed within a self-adhesive card and further wherein the GPS device is attached to the component by adhering the self-adhesive card to the component.

7. The method of claim 1, wherein the GPS device is embedded within a thread protector and further wherein the GPS device is attached to the component by attaching the thread protector to a thread connector of the component.

8. The method of claim 1, wherein the GPS device provides location signals continuously.

9. The method of claim 1, wherein the GPS device provides location signals at predetermined time intervals.

10. The method of claim 1, further including the step of providing an alarm when one of the smart components is not on a predetermined route or at the designated location.

11. The method of claim 1, further including the step of inspecting the components at the designated location and transmitting the results of the inspection to the tracking processor.

12. A method for monitoring shipments of a plurality of smart components and enabling assembly of the plurality of smart components, the method comprising:

a. encoding component information including an identifier, assembly instructions, and specification information; on one of the plurality of smart components into a data storage of a GPS device, forming a smart GPS device; wherein the smart GPS device further has a GPS processor and a GPS transmitter/receiver; further wherein the smart GPS device is attached to the smart component;

b. repeating step (a) for each smart component of the plurality of smart components;

c. actuating the GPS transmitter/receiver for each of the plurality of smart components, wherein each GPS transmitter/receiver provides a location signal to a network;

d. using a tracking processor in communication with a tracking data storage to track locations of each smart component, wherein the tracking processor is in communication with the network and receives the location signals from the network;

e. shipping the plurality of smart components while simultaneously tracking the locations of each of the plurality of smart components using the tracking processor, until the smart components reach a designated location;

f. retrieving from each smart component the component information using an assembly processor in communication with an assembly data storage; and g. assembling the plurality of smart components at the designated location, using the assembly instructions retrieved from each smart component.

13. The method of claim 12, wherein the assembly instructions comprise instructions for assembling the smart component with a member of the group consisting of:
(i) another smart component;
(ii) another component; or
(iii) combinations thereof.

14. The method of claim 12, further including the step of forming a record of each route used by each of the plurality of smart components using the tracking processor and storing the record in the tracking data storage.

15. The method of claim 12, wherein the specification information for each smart component includes: dimensional specifications for the smart component; material composition of the smart component; inspection test results for the smart component; a source of origin or manufacture of the smart component; at least one trip route of the smart component; or combinations thereof.

16. The method of claim 12, wherein the GPS device provides location signals continuously.

17. The method of claim 12, wherein the GPS device provides location signals at predetermined time intervals.

18. The method of claim 12, further including the step of providing an alarm when one of the smart components is not on a predetermined route, at the designated location, or combinations thereof.

* * * * *